Nov. 10, 1970 — A. MARBURG — 3,539,425
METHOD OF ASSEMBLING THE WALLS OF A BOX-LIKE STRUCTURE
Filed Nov. 9, 1966 — 2 Sheets-Sheet 1
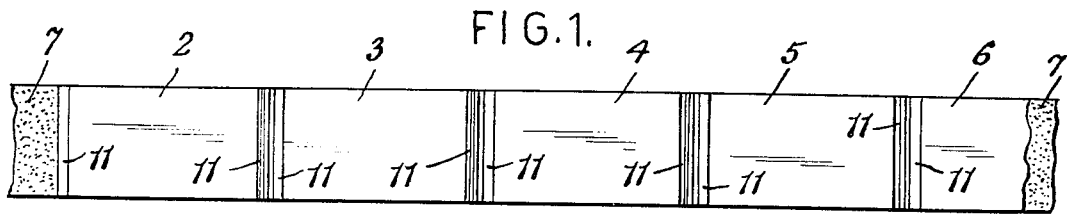
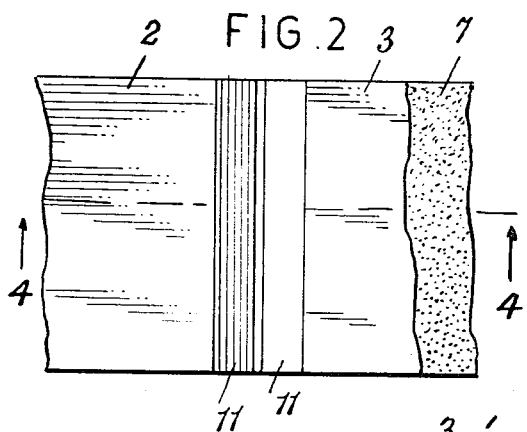
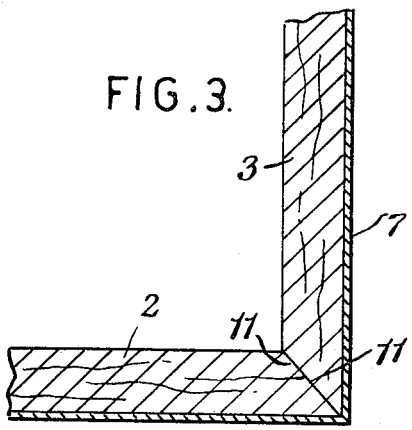
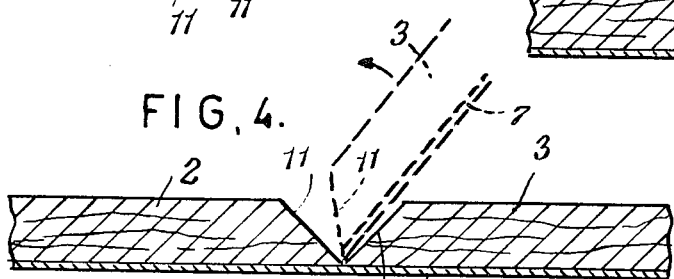
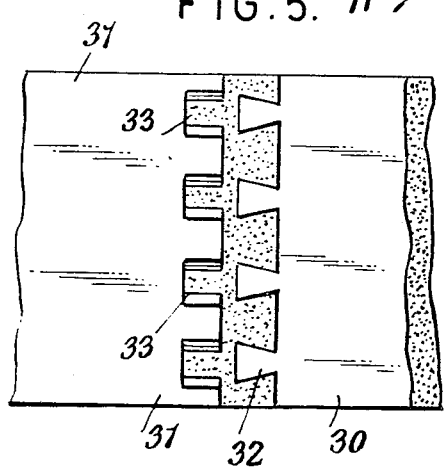
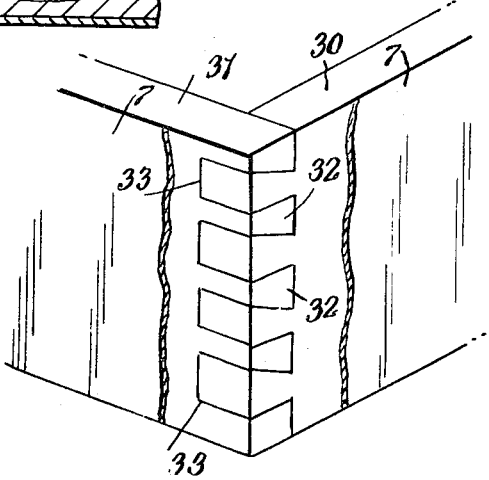
INVENTOR.
Arthur Marburg
BY
Attorney Nov. 10, 1970     A. MARBURG     3,539,425
METHOD OF ASSEMBLING THE WALLS OF A BOX-LIKE STRUCTURE
Filed Nov. 9, 1966     2 Sheets-Sheet 2
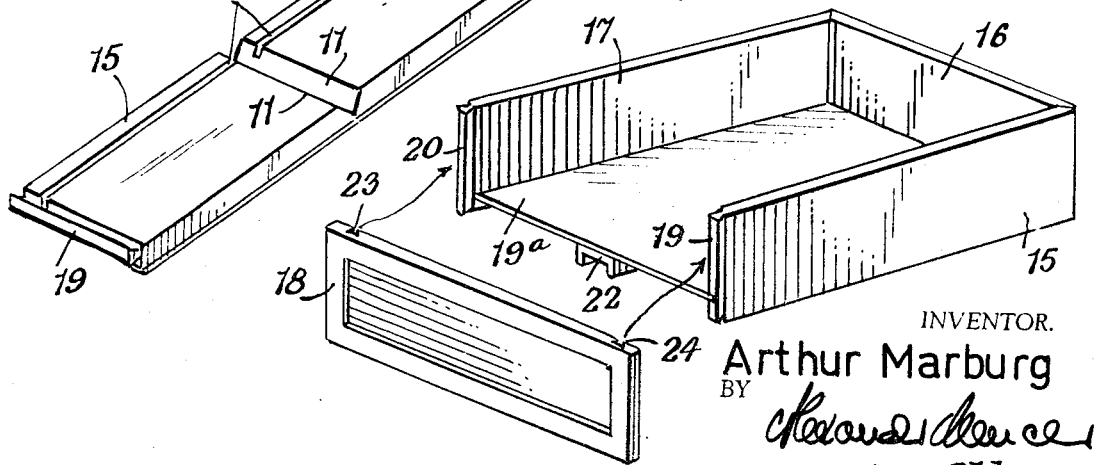
INVENTOR.
Arthur Marburg
BY
*Attorney*

United States Patent Office 3,539,425
Patented Nov. 10, 1970

3,539,425
METHOD OF ASSEMBLING THE WALLS OF A BOX-LIKE STRUCTURE
Arthur Marburg, P.O. Box 1326,
Morristown, Tenn. 37814
Filed Nov. 9, 1966, Ser. No. 593,149
Int. Cl. C09j 5/00
U.S. Cl. 156—247                                    5 Claims

ABSTRACT OF THE DISCLOSURE

The invention essentially consists of an assemblable form of drawer, chest or similar article wherein the component pieces are available as a pattern, each of said pieces being adhesively secured as by pressure-sensitive adhesive to a flexible carrier strip foldable along lines to effectuate final abutting positions of the pieces toward the final formation of the article. The said strip may remain as a decorative facing in the final form of the article or removed therefrom as by a peeling operation.

---

The present invention relates to the production of various articles such as drawers for chests, cabinets, cases for goods of all kinds, instrument cases, jewelry boxes, furniture and many other articles, and it has for one of its objects the provision of means by which any of the above articles can be readily assembled by the provision of parts of the same in a manner to greatly facilitate the assemblage with a minimum of skill and effort.

Many articles such as drawers for chests, cabinets and articles of furniture, while often made of fine woods or simulations of fine woods by the application of facings or veneers, present an unattractive and unsatisfactory appearance because of the formation of poor joints and generally poor assembly of the parts. This often occurs because the assembler either lacks the required tools for producing accuracy of fit of the parts or else lacks the skill or ability to do a neat and precise job of joining together the elements of the article being assembled.

It is therefore one of the objects of the present invention to provide parts for the assemblage of any specific article such as a drawer, chest, container or the like, such parts being maintained together on a carrier and with the parts formed with shaped ends or elements arranged so that when the parts are placed together in their assembled relationship, assurance of interfit or accurate joinder will be had and the resultant finished product will present the appearance of having been expertly made.

More particularly, the invention contemplates the provision of a strip or sheet of flexible material, such as paper, cloth, vinyl, other plastics, composition or the like upon which a plurality of the parts intended for the assembly of a specific article, are attached, the adhesive attachment of the strip or sheet to the parts being such that if desired the strip can be pulled away or separated from the parts after the parts are assembled. The parts are so assembled on the sheet or strip in close proximity and in such relationship that folding of the sheet or strip will bring the parts borne by it to the positions which they are to occupy in the finished product. The ends of the pieces borne by the strip may be either beveled or otherwise shaped to interfit. Thus, when adhesive or other joining elements is applied on the ends of the pieces or parts and the strip is folded to bring the adhesive-coated ends into contact, the pieces will be adhesively or otherwise united and a precise and accurate joint will be provided between them. The strip or sheet may then be stripped away, or it might remain as a finished and attractive facing for the article that has been produced, or further joining and reinforcing elements added while the strip is either on or off the pieces.

With these and other objects to be hereinafter set forth in view, I have devised the arrangement of parts and steps to be described and as more particularly pointed out in the claims appended hereto.

In the accompanying drawings, wherein illustrative embodiments of the invention are disclosed, FIG. 1 is a face view of a number of wooden parts or pieces arranged in end-to-end relationship and adherently mounted on a carrier strip and as presented to an assembler or furniture manufacturer for joinder to produce a specific article;

FIG. 2 is a face view of portions of two of the parts on the carrier strip;

FIG. 3 is a sectional view of the two parts of FIG. 2 after the same have been fitted together at right angles to one another and have had their abutting beveled ends secured together as by glue;

FIG. 4 is a sectional view, taken substantially on the line 4—4 of FIG. 2, looking in the direction of the arrows;

FIG. 5 shows two parts in end-to-end relationship on the carrier strip, the ends of these parts respectively having interfitting elements;

FIG. 6 shows the parts of FIG. 7 in joined relationship;

FIG. 7 shows parts respectively provided with a tongue and groove and mounted upon a carrier strip;

FIG. 8 is an enlarged horizontal sectional view of FIG. 7;

FIG. 9 shows parts in an interfitting endwise joinder;

FIG. 10 shows an assembly of parts such as can be used for the production of three side walls of a drawer;

FIG. 11 shows the walls of the drawer operatively united and the bottom of the drawer being inserted into place;

FIG. 12 shows the front panel of the drawer about to be placed in position, and

FIG. 13 shows two parts respectively provided with a dowel and a recess for its accommodation.

In carrying out the invention, the parts or pieces for the production of any given article, such as a drawer, chest, cabinet or the like, are preferably factory produced so that the portions or elements of the pieces which are intended to abut or inerfit are produced by the most effective means and are insured of accuracy.

This is possibly best illustrated by the disclosures of FIGS. 1 to 4 inclusive wherein a plurality of parts 2, 3, 4, 5 and 6 are arranged in end-to-end disposition upon a carrier strip 7 to which the parts are adhesively attached. If in the assembly or joinder of the parts, the flexible carrier strip is to remain as a covering or facing for the assembled parts, the adherance of the strip to the parts may be permanent and the nature of the strip can be varied and can represent wood graining, leather or the like. On the other hand, if the strip is to be removed or stripped away before or after the parts or pieces are joined together, the carrier strip can be provided with a pressure-sensitive adhesive enabling the strip to carry and maintain the parts together, yet permitting the strip to be manually pulled away when its presence is no longer required. The strip may, in such instance, be of any material such as paper or other inexpensive material.

The parts borne by the flexible strip or sheet may be pieces of wood, as disclosed in FIGS. 8, 9 and 13; these elements might also be of other materials including blocks or slabs composed of wood particles or granules, such as sawdust, wood chips etc. united by a suitable binder into a coherent piece. In such cases the piece can be covered on one or both of its faces by a suitable covering material 10 such as vinyl or other material and which can be made to simulate wood graining or other surfacing.

The strip or sheet 7, if it is to be used merely as a temporary carrier for the wood parts, may be composed of paper, fabric or plastic and may be coated with a pressure-sensitive adhesive by means of which it will adhere to the faces of the wooden pieces.

The parts 2 to 6 inclusive or other parts adhesively attached to the strip or sheet 7, are preferably placed on the strip in such relative positions that they can be united or joined together without being detached from the strip. For this purpose the ends 11 of the several wooden pieces may be beveled as shown in FIGS. 1 to 4. When the strip 7, carrying the wooden pieces 2 to 6 is received by the assembler, and the parts are to be joined or put together at right angles to one another for example, as in FIG. 3, it is merely necessary to apply glue on the beveled ends 11 and bring the ends of the pieces into contact by movement of one of them as indicated by the arrow in FIG. 4. The flexibility of the carrier strip 7 enables it to fold or bend when the wooden parts are moved as above described and if the strip is employed merely as a temporary carrier for the parts, the strip can be detached after the wooden parts are glued together or are otherwise united.

If the strip 7 is intended for use as a permanent covering or facing for the wooden pieces, it being then located on the outer faces of the united pieces, it can remain adhesively-attached thereto.

The manner in which a specific article, such as a drawer for a desk or chest, can be assembled is disclosed in FIGS. 10 to 12 inclusive. Therein the side walls 15, 16 and 17, adhesively attached to a carrier strip 7, are delivered to the furniture manufacturer or other manufacturer or assembler together with a front wall 18, a bottom wall 19a and a bottom guide 22. The three side walls 15, 16 and 17 may be strips of solid wood or they may be plastic or vinyl-covered strips of pressed wood, wood chips or the like. These strips are adhesively mounted end-to-end on the carrier strip with their beveled ends 11 in close proximity. The end strip 15 is formed with a dovetail tenon 19 on one end and a similar dovetail tenon 20 is provided on one end of the strip 17. Each of the strips 15, 16 and 17 is formed on one of its faces near one of its longitudinal edges with a groove 21 for the reception of the bottom wall 19a.

Upon receipt of the parts 15 to 20 inclusive, the assembler brings the parts 15 and 17 uprightly and at right angles to the central part 16 after having first coated the beveled ends 11 of the several parts with glue, so that a three-sided frame, shown in FIG. 11, is the result. The carrier strip 7 may then be detached or before detachment reinforcing joining elements be added. There need be no detachment if the carrier strip is to be used as a covering or facing for the walls of the drawer.

The bottom wall 19a is then slid into the grooves 21 substantially as shown in FIG. 11 and the guide piece 22 can then be glued to the bottom on the under side thereof. The front wall 18, which may be ornamented or embellished or provided with a decorative facing, is now fitted on and glued to the dovetailed ends 19 and 20. Said front wall 18 has dovetail slots 23 and 24 for the reception of the dovetail tenons 19 and 20. When the front wall 18 is glued in position as above described, the assembly of the drawer will be complete.

Because of the fact that all of the parts of the drawer or other article which come together or interfit in a joint are factory produced by precision machinery, it is obvious that when the pieces are put together by an assembler or furniture factory and are glued or otherwise united, perfect complementation of the assembled parts will result and the finished dawer or other article will be straight and true. Such article can even be assembled by unskilled hands with the assurance that the finished product will in construction and appearance be equal to one that has been factory produced.

The assembly of parts of an article on a carrier strip which can be subsequently detached if desired, after the joinder of the parts, tends to insure the joinder of the parts in their proper relationship since the carrier strip not only acts as a supporting element for the pieces but as an indicator disclosing their relationship.

While it has been suggested that the parts or pieces borne by the carrier strip 7 can be provided with beveled ends 11 which are brought together and are united at right angles, the parts may be provided with various forms of interfitting end elements. For example, in FIGS. 5 and 6 the adjacent parts 30 and 31, secured on the strip or sheet 7 respectively have their ends formed with dovetail tenons 32 and dovetail slots 33. The joinder of these parts, after the application of glue to the dovetail elements, is shown in FIG. 6.

In FIGS. 7 and 8 the strip 34 has a tongue 35 on its end for reception in a groove 36 in the adjacent piece 37. In FIG. 9 the ends 38, 39 or the adjacent pieces 40 and 41 interfit with an overlap and in FIG. 13 one of the pieces 42 is provided with one or more dowels 43 for reception in one more recesses 44 in an adjacent piece.

With the several arrangements described, the parts of any article to be assembled can be provided with precisely-formed ends or interfitting elements and the pieces arranged in such juxtaposition on a carrier strip so that the assembler will find no difficulty in properly uniting the parts to result in a finished product of strength and good appearance.

Having thus described embodiments of the invention, it is obvious that the same is not to be restricted thereto, but is broad enough to cover all structures coming within the scope of the annexed claims.

What I claim is:

1. The method of assembling the walls of a box-like or similar structure comprising, adherently attaching the separated walls in spaced and end-to-end position on a permanently flexible carrier sheet, said sheet being provided with pressure sensitive adhesive therefor, providing means for securing the ends of the walls, and folding under ambient conditions the sheet in a manner to bring the walls to a position as occupied in the finished structure and for securement of the ends thereof.

2. The method as set forth in claim 1 wherein the means for securing the ends of the walls comprises beveling said ends and applying securing means thereto.

3. The method as set forth in claim 1 wherein the means for securing the ends of the walls comprises complementary interfitting means.

4. The method of assembling the walls of a box-like or similar structure comprising, adherently attaching the separated walls in end-to-end position on a flexible carrier sheet, coating the ends of the walls with an adhesive, folding the sheet in a manner to bring the walls at right angles to one another and to establish adhesive contact between the ends of the walls, and then stripping the sheet away from the walls and allowing them to remain attached to one another by the adhesive joinder between their ends and sliding a bottom piece in slots provided in the walls and then fitting a front panel on the ends of two of the walls.

5. The method of making a drawer comprising, adresively attaching three beveled end pieces of wood on a facing sheet, folding the sheet to bring the pieces into position relatively to one another to form a three-walled structure and adhesively uniting the three walls, sliding a bottom wall in place between the three pieces and then fitting a front wall on the structure by interfitting elements on said front wall with complementary elements on the ends of the three pieces, and stripping away the facing sheet when the parts are assembled and are adhesively united.

References Cited

UNITED STATES PATENTS

| | | | |
|---|---|---|---|
| 383,175 | 5/1888 | Gardner | 156—217 |
| 2,041,974 | 5/1936 | Sloan | 156—211 |
| 2,252,539 | 8/1941 | Adams | 156—304 |
| 2,818,168 | 12/1957 | Tobey et al. | 161—406 X |
| 2,854,373 | 9/1958 | Beach | 156—299 X |
| 3,043,734 | 7/1962 | Porter | 156—299 X |

REUBEN EPSTEIN, Primary Examiner

U.S. Cl. X.R.

156— 204, 217, 249, 299, 304; 161—406; 144—309